United States Patent
Barns

[11] 3,867,416
[45] Feb. 18, 1975

[54] CONTINUOUS PROCESS FOR DRYING AND EXTRACTING OILS FROM SOLID MATERIALS

[75] Inventor: Roy W. Barns, Piqua, Ohio

[73] Assignee: The French Oil Mill Machinery Company, Piqua, Ohio

[22] Filed: Dec. 31, 1969

[21] Appl. No.: 889,712

Related U.S. Application Data

[63] Continuation-in-part of Ser. No. 565,434, July 15, 1966, abandoned.

[52] U.S. Cl............... 260/412.8, 23/270, 260/412.4
[51] Int. Cl............................................. C11b 1/10
[58] Field of Search........................ 260/412.4, 412.8

[56] References Cited
UNITED STATES PATENTS

| | | |
|---|---|---|
| 2,663,623 | 12/1953 | Anderson........................ 260/412.4 |
| 3,170,767 | 2/1965 | Wistreich.......................... 260/412.8 |
| 3,297,731 | 1/1967 | Hale et al. ....................... 260/412.8 |
| 3,535,354 | 10/1970 | Karnofsky........................ 260/412.8 |
| 3,674,657 | 7/1972 | Levin............................... 260/412.8 |
| 3,723,487 | 3/1973 | Couche............................ 260/412.8 |

Primary Examiner—Johnnie R. Brown
Attorney, Agent, or Firm—Sommer & Sommer

[57] ABSTRACT

A continuous drying and oil extraction process and apparatus wherein counterflow is established between successive vertical beds of stratified oil bearing particles in an extractor and ascending vapor solvent which passes upwardly through the beds agitating the particles therein to produce successive fluidized bed conditions, the vapor carrying liquids upwardly therewith to the top of the extractor.

8 Claims, 4 Drawing Figures

PATENTED FEB 18 1975

TO MISCELLA PUMP

CONTINUOUS PROCESS FOR DRYING AND EXTRACTING OILS FROM SOLID MATERIALS

SUMMARY OF INVENTION

This invention relates to an oil extraction and a dehydration process utilizing a continuous counterflow method on animal, fish or vegetable particulate materials supplied to an extractor unit. This application is a continuation-in-part of Ser. No. 565,434, filed July 15, 1966, now abandoned.

Solvent vapor is passed upwardly through successive vertical layers of the particulate material at a sufficient velocity to agitate the individual particles to produce a fluidized bed condition for the successive layers of material while permitting the particles to settle at an even rate down through the successive beds to the bottom of the extractor unit.

In the past, both a counterflow technique and a batch technique had been used, but each method had its individual drawbacks.

The continuous methods used liquid solvents that were passed through the solid materials, usually from top to bottom of the extractor. This technique was inefficient since there was a tendency for the solvent to channel rather than distribute itself uniformly through the particulate material. In this type of process it was usually necessary to reduce moisture in the oil bearing particles by pre-drying the materials before they were placed in the extractor, since the non-mercible liquid solvents used had no dehydration effect. In addition to requiring the extra pre-drying effect, in many cases the pre-drying adversely affected the material to be used in the extractor.

A second type of previously used process was the batch technique, such as illustrated in Barns U.S. Pat. No. 2,695,304. This process suffered from the usual drawbacks of a batch rather than a continuous process. This method did not provide the counterflow movement of oil-bearing materials and vapor solvent which is found to be the only practical way to azeotropically dry and extract oils from materials, particularly those having a high moisture content.

A common drawback of both of the above-mentioned previous methods is the presence of finely divided materials in the miscella which is drawn from the extractor unit. These particles produce serious operating problems in the subsequent evaporation and distillation operations performed on the miscella fluid.

The present invention provides a continuous process which does not have the drawbacks of the processes mentioned above, and is more efficient.

Accordingly, it is a general object of this invention to provide a continuous dehydration process in which oils are obtained from oil-bearing materials, and such process has none of the drawbacks of the previously used methods.

This invention makes use of a fluidized bed technique, wherein the beds are activated by solvent vapor to bring about complete mixing of the solvent with the individual particles of the bed, resulting in removal of water from the oil-bearing particles as a result of condensation of the solvent vapor thereon as it passes upwardly through the successive beds of particulate materials.

The extraction column consists of a plurality of vertically-spaced fluidized beds of particulate material, the material being mainly supported on perforate plates, but also supported by the upward flow of the solvent vapor as it passes from the bottom to the top of the extractor unit. In this unit, the velocity of the solvent vapor is adjusted with respect to the density and size of the particles so that there is a slight tendency of the particles to settle downward passing through the holes in the individual plates against the flow of the solvent vapor as it passes upwardly through the openings in the successive plates and through the beds of accumulated particulate material.

This results in an azeo-extraction process wherein the vapor phase solvent removes oil from the material as it displaces the ordinary water contained therein, this coming about automatically and continuously under the phase rule conditions established as an azeotropic composition tends to form in the vapor.

In this process, when the vapor contacts the solids, the vapor contains less than the required portion of water for the azeotropic condition, and the phase rule requires that the deficiency of water be supplied by vaporizing part of the water contained in the material. This requires heat, which is supplied by condensation of the solvent vapor on the material, so that there is a displacement of the water in the particulate material by condensed solvent, resulting in dehydration of the material. This is an extremely efficient dehydration technique, since most water-immiscible solvents have latent heat that are only a fraction of that of water, and several pounds of the solvent are condensed for each pound of water removed from the particulate material. This action increases the efficiency of the oil extraction from the particulate material, since the water contained therein is distributed internally in close proximity to the oil cells, and the condensed solvent which replaces the water is brought into intimate contact with such oil-bearing cells resulting in an extremely fast and rigorous solvent extraction process. Most of the solvents used for oil extraction are immiscible with water. Such solvents are heptane, ethylene dichloride, trichlorethylene, perchlorethylene, and hexane. It should be noted, however, that the fluidized bed process can also be used effectively with water-miscible solvents, such as isopropanol, the solvent normally used in oil extraction on fish.

In this process, the upwardly flowing solvent vapors pass through the interstices between the particles drawing upwardly the water and oil to the top of the extractor where a pool of miscella forms above the highest bed of particulate material. This miscella contains a smaller percentage of finely divided particulate materials than that of any other processes, and obviates the operating problems created by their presence in the following evaporation and distillation operations performed on the miscella fluid. Such finely divided particulate material problem is eliminated in the present process because the particles can be introduced into the top of the extractor unit with a higher percentage of moisture, because of the dehydration brought about in this process. The higher percentage of moisture assists in the agglomeration of the material as it is introduced into the miscella pool, and the greater density of the particles, both contribute to a higher settling rate and the smaller percentage of fines suspended in the miscella.

The reaction of the solvent vapor and water at the azeotropic conditions has been mentioned above to explain their interaction during the process. However, fluidization of the particles by the solvent vapor is an essential requirement of this process. Fluidization of the beds of oil-bearing particles by the solvent vapor brings about rapid movement of the particles within the bed and among themselves in a continuous recirculation movement. This condition results in full and complete mixing of the vapor and particles, and eliminates the clogging and channelling conditions encountered with prior counterflow techniques.

In the accompanying drawings:

FIG. 2 is a sectional elevation of the screen and its mounting and manner of operation;

FIG. 3 is a cross-sectional elevation on a larger scale of a part of the same, the section being taken approximately along the line A—A of FIG. 2.

Figure 1:
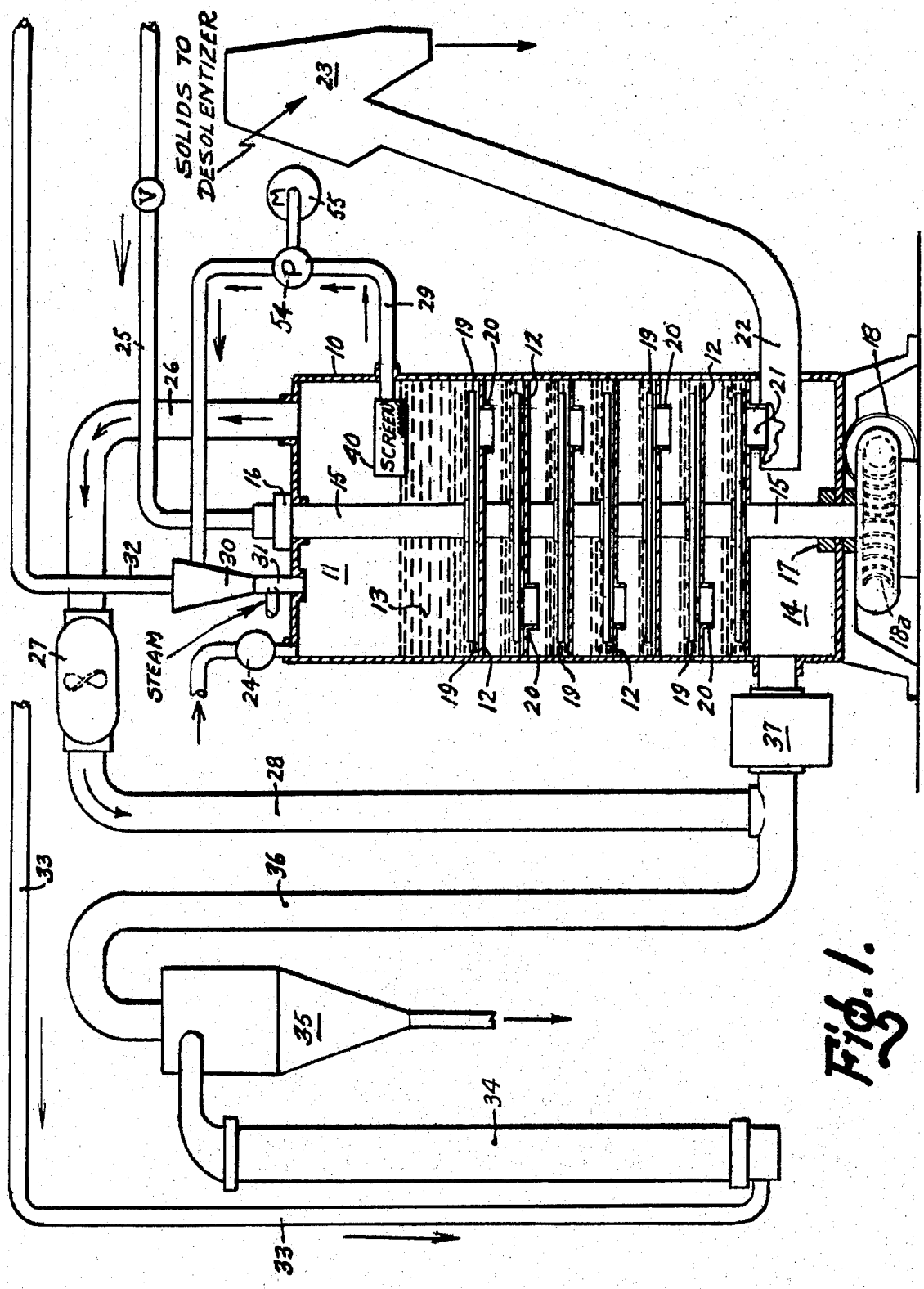
FIG. 1 is a schematic drawing of a simple apparatus for practicing the invention, as one example thereof, but with the rotary screen shown only in position and not as mounted and operated.

In the example of the apparatus shown in FIGS. 1–3 and referring first to FIG. 1, the equipment shown is useful for the extraction of oils and oleaginous materials with water-miscible solvents. It includes a closed casing 10 having therein an extraction chamber 11. The casing is provided with a plurality of perforated plates 12 that act as partitions which extend entirely across the chamber in vertically, spaced apart, but super-posed relation, leaving a compartment 13 at the top of the chamber and another one 14 at the bottom of the chamber. A vertical shaft 15 extends vertically and centrally through the casing and partitions or plates. It is rotatably supported near its upper end in a bearing 16 on the casing 10 and near its lower end in a bearing 17. A motor 18 below the casing 10 is connected by a speed reducing drive mechanism 18a to the shaft for rotating it slowly. The shaft 15 carries a plurality of stirrer arms 19 fixed thereon, one just above but close to each plate, so as to sweep the upper surface of each plate. The bottom plate 20 has merely a discharge aperture 21 that opens into a duct 22 that extends out of the casing and contains a suitable discharge conveyor (not shown) which delivers the extracted material through a vapor sealing device 23 to suitable desolventizing equipment (not shown), as usual in extraction apparatus. The openings in the lower plate 20 are considerably smaller than those of the openings in the perforated plates 12. These holes are made smaller to preclude weeping of material into the vapor chamber.

The shaft 15 is open at its top and hollow from its top down to one of the intermediate arms. That intermediate stirrer arm 19 is hollow, communicates with the passage in the shaft, and has apertures along its length through which fresh liquid solvent, which is introduced into the upper end of the shaft under pressure may pass into the solids in that intermediate plate where they are being horizontally stirred by that intermediate arm.

The casing 10 has a vapor sealed feeder inlet 24 through which the materials to be extracted are introduced into the casing and deposited on the top plate 12. Fresh solvent is supplied under pressure to the upper end of the shaft 15 through pipe 25 and may be recovered as liquid solvent. A suitable rotatable coupling 16 is provided between the pipe 25 and the shaft 15. A vent duct 26 leads from the top of chamber 11 through a blower 27 and another duct 28 to the compartment 14 at the bottom of the casing, to recirculate the solvent vapors upwardly through the casing at a velocity sufficient to fluidize the layers of the materials being extracted that are on the plates in transit through the casing chamber 11. This velocity is enough to bring the fluids up through the beds but is not so great that a settling of the particles at a reduced rate through the openings in the plates is prevented. The liquids so carried upwardly will collect as a pool of miscella on the top layer of materials, and the miscella from this pool is progressively removed and passed by pipe 29 to a liquid cyclone separator 30 where the fines are removed and wetted and returned by pipe 31 to the top of casing chamber 11 where they fall on the materials on the top plate and are passed through the different layers and finally discharged in duct 22. The clarified miscella, now free of fines, from the separator 30, is sent by a pipe 32 to a recovery system (not shown) where the oils and oleaginous materials are separated from the miscella and the recovered solvent sent by pipe 33 to an evaporator 34. The solvent vapors from the evaporator pass under pressure through a vapor separator 35 and the solvent vapors therefrom pass by duct 36 to the bottom of the casing for recycling through the materials being extracted where they join the vapors from duct 28. A superheater 37 may be provided for ducts 28 and 36 after they join and before they discharge into the casing 10. The superheater is not always necessary, but its use is often advantageous.

The removal of miscella from the pool on the top layer in casing 10 is preferably through a rotary screen as shown in FIGS. 2 and 3. The cylindrical drum 40 is disposed with its axis horizontal in the casing 10 so that it will dip into the miscella pool not quite half submerged. A shaft 41 extends axially through the drum and at its inner end is rotatably mounted in a bearing bracket 42 and at its outer end, outside of the casing, in a bearing, which forms part of a stuffing gland 43. The drum 40 has a hollow hub 44 at its outer end which is received in a bearing 45 provided in a wall of the casing 10, and in turn supported by a bracket 46. The inner end of the drum has a collar 47 that is fixed on the shaft so that the drum will rotate with the shaft.

The hub 40a of the drum is the same size as, and is aligned with a fixed duct 48 that is received in the bearing bracket 46 and through which the shaft 41 extends. This fixed duct 48 carries the stuffing gland and bearing 43 for the outer end portion of the shaft 41. A sprocket 59 is fixed on the outer end of the shaft 41 and is rotated slowly by a chain 50 that passes around the sprocket and also around a sprocket 51 on the shaft of a speed reduction gear device 52 which in turn is driven by a motor 53.

Included in the pipe 29 (FIG. 1) is a miscella pump 54 driven by a motor 55. A pipe 56 (FIGS. 2 and 3) extend into the duct 48 and along it and the drum beside the shaft 41, and within the drum it has a plurality of nozzles 57 that are directed to the upper side of the inner periphery of the drum. The drum has a horizontal screen 58 as its peripheral wall through which miscella from the pool flows into the drum, and the screen periphery keeps out solid particles of the material being extracted. Solvent is delivered under pressure through pipe 56 and sprayed by the nozzles 57 as streams against the inside face of the upper part of the drum screen to wash off any particles of the material being extracted that might adhere to the screen openings and plug them. The miscella entering the drum passes over into duct 48 and then to pipe 29.

In this type of extraction the solvent vapors are used to produce a fluidized bed of the material being extracted to facilitate the passage of the oil solvent through the materials of the bed which are finely divided or become so during the extraction. In this operation, part of the water in the material being extracted would go into the liquid phase and would leave the extractor with the miscella through the screen of the rotary drum in the top of the casing. The solvent vapor would be recirculated by the blower and returned to the extractor casing. This solvent would have as its source the product from a purification and refining step which would remove the oil and water from the miscella. The bulk of the solvent used for extraction would be supplied in liquid form through the shaft and hollow apertured arms because the condensation of vapors would be limited.

Figure 4:
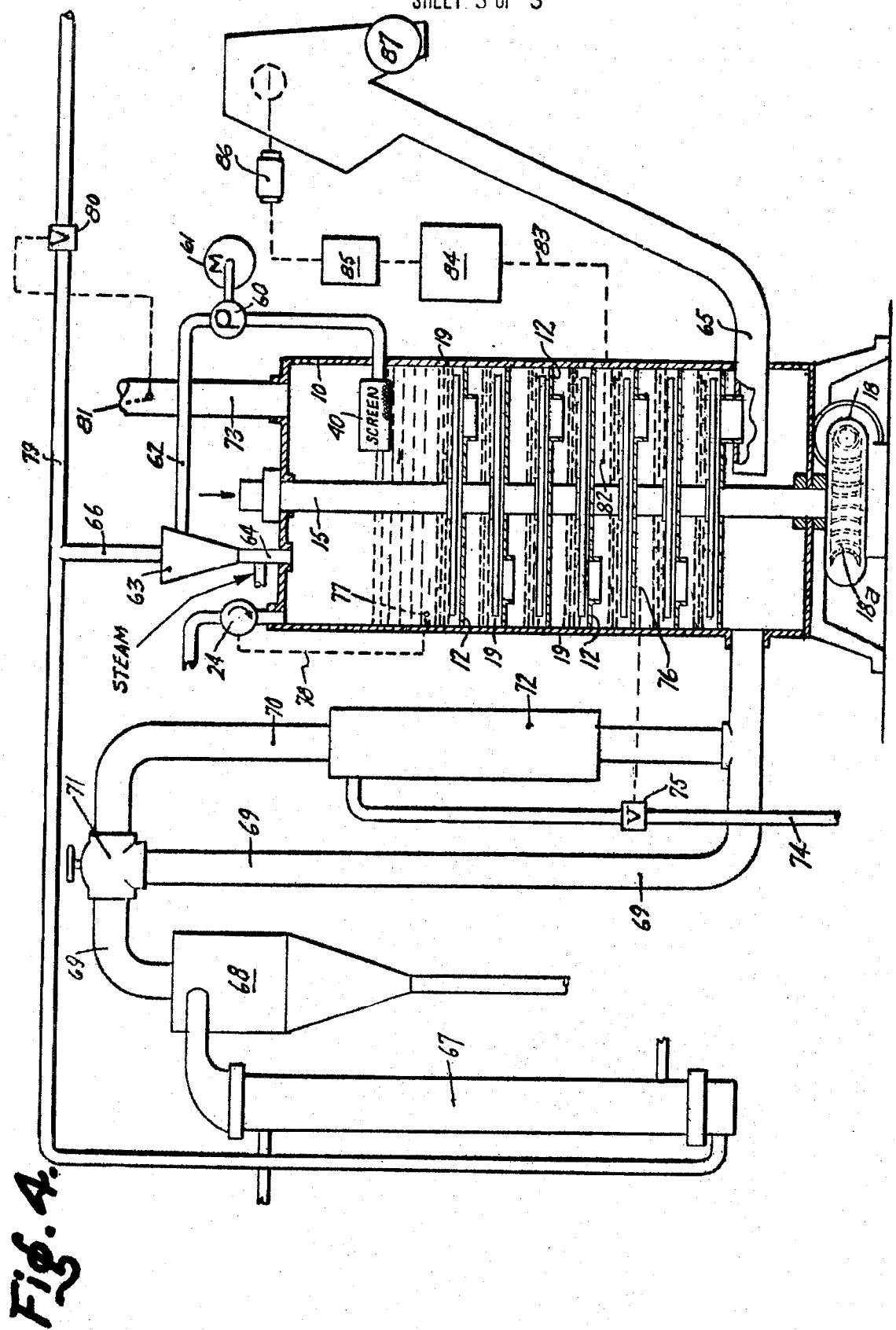
FIG. 4 is a schematic drawing of another example of apparatus that may be used for this practice of the invention in azeotropic extraction.
Figure 1:
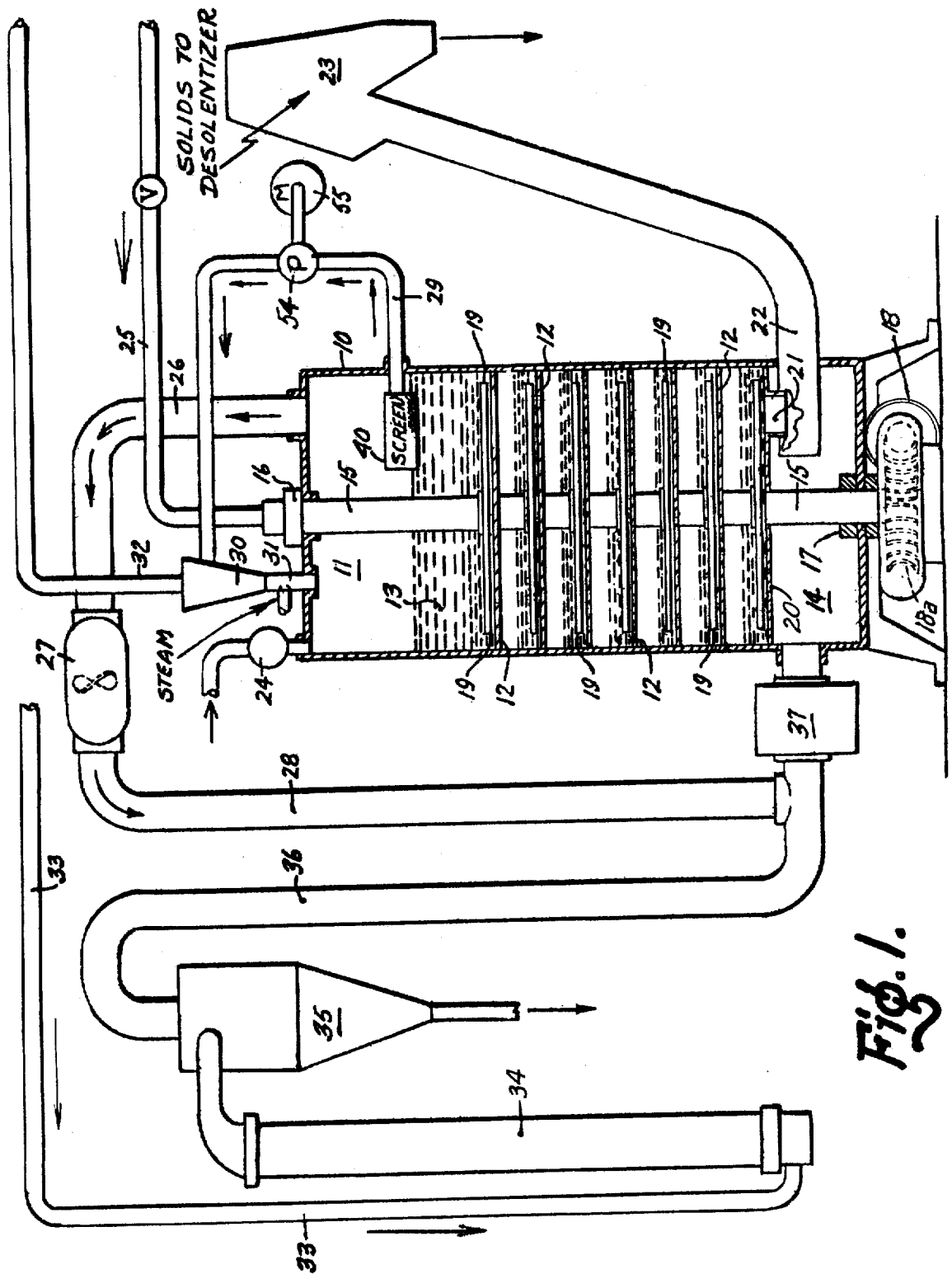
Figure 4:
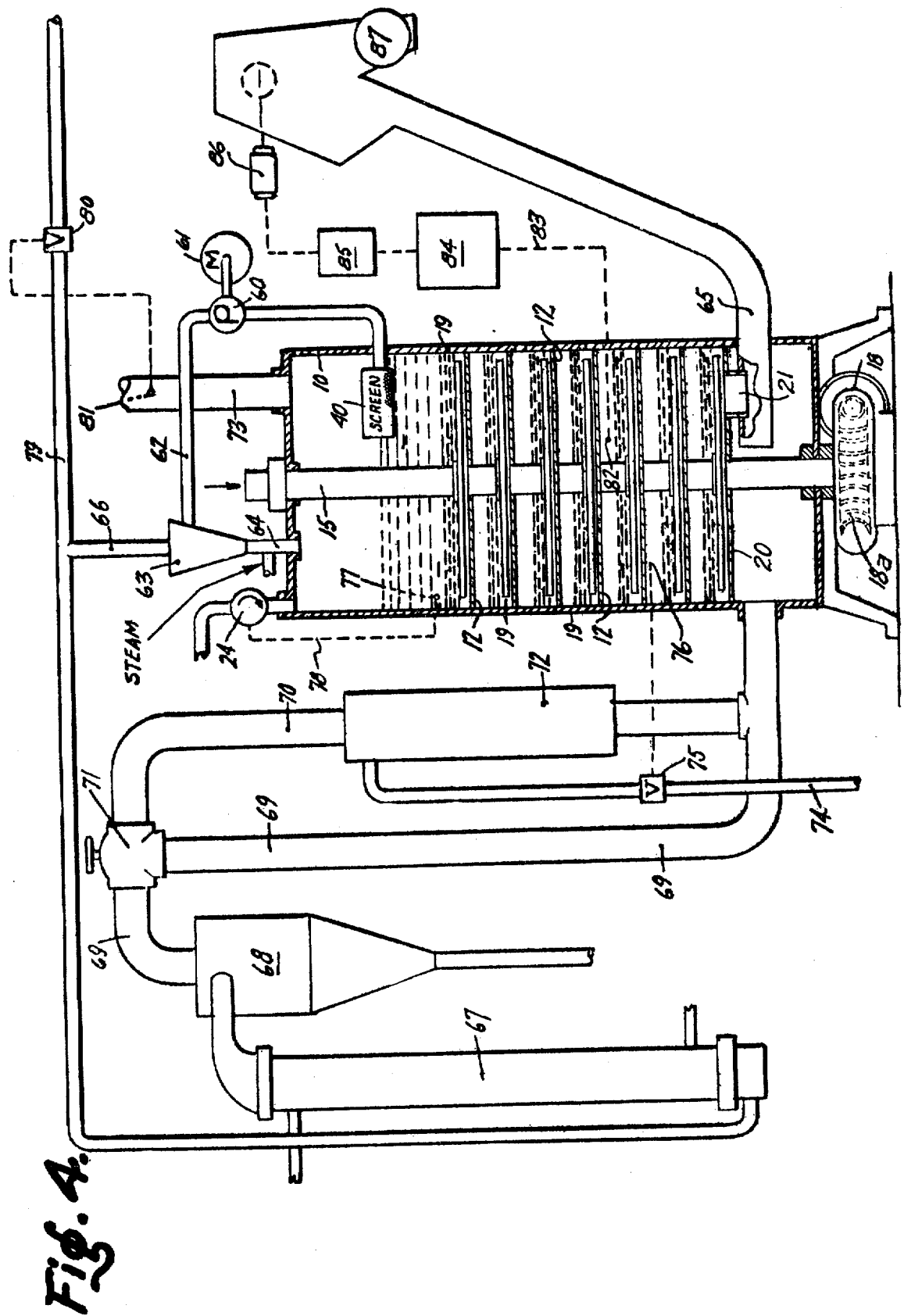

The apparatus of the example shown in FIG. 4 employs the basic azeotropic extraction process of my U.S. Pat. No. 2,695,304 and is a continuous extraction process. In FIG. 4 the extraction casing 10 corresponds to the one described for FIGS. 1 to 3 inclusive, except as will be explained. The drum 40 is mounted and rotated as explained for drum 40 in FIGS. 1–3, and the miscella is withdrawn from the cylinder through pump 60 driven by motor 61 and delivered by pipe 62 to the liquid cyclone separator 63 where the fines are separated from the miscella and returned by pipe 64 to the casing where they fall on the materials of the top layer and pass with them again through the extractor and are deposited into the duct 65 for delivery to a desolventizer. Steam may be added to the bottom of the cyclone separator 63 to wet the fines as they are returned to the extractor casing 10.

The clarified miscella from the cyclone separator 63 is conveyed by pipe 66 to an evaporator 67 where the solvent is separated from the miscella as a vapor and the solvent vapors passed through the separator 68 into a duct 69. The duct delivers solvent and vapors to the lower end of the extractor chamber from which the vapors pass upwardly through the apertured plates 12 and the layers of material on these plates at a velocity sufficient to keep the materials of the layers fluidized, carry with them any liquids and prevent descent of any liquids downwardly through the layers. A branch pipe 70 is connected to pipe 69 near the separator 68 through a 3-way valve 71 and it passes to a superheater 72 and then joins duct 69 to deliver superheated vapors to the bottom of casing 10. The 3-way valve sends the vapors, selectively, directly to the casing 10 by duct 69 or through the superheater 72 to the casing 10. The superheating of the solvent vapors is not essential in all cases, but is used when vapor desolventizing is being used to control the temperature in the materials being discharged from the extractor.

The uncondensed vapors reaching the top of the casing are sent by pipe 73 to a condenser (not shown) where the solvent is recovered and sent to the evaporator 67. The shaft 15 and some of the lower stirrer arms 19 are hollow as explained for FIG. 1, so that fresh liquid solvent can be admitted to the materials being extracted when the materials being extracted have a relatively low moisture content that does not condense enough solvent to completely extract the oil.

Steam is supplied to the superheater through pipe 74 under control of a valve 75 that is operated in response to a thermostat unit 76 located in the casing 10 about two or three plates above the bottom one. A level control device 77 is disposed in the casing 10 at a level corresponding to the desired upper level of the material being extracted on the top plate. This device 77 is connected by a control 78 to the vapor sealed, feed in mechanism 24 through which the materials to be extracted are delivered at the proper rate to the top plate within the casing to keep the level of materials on that top plate of the desired height.

A liquid solvent supply pipe 79 controlled by a valve 80 is connected to the pipe 66 that connects the cyclone separator 63 to the evaporator 67. The valve 80 is thermally controlled from a control 81 located in the duct 73. This controls the amount of fresh liquid solvent that is delivered to the evaporator. A thermovouple 82 or moisture response unit operating on electrical resistance or capacitance is disposed in casing 10 between two of the lower plates 12 and is connected by line 83 through a voltage amplifier 84 to a selenium controlled rectifier 85 which delivers D.C. current to a D.C. motor 86 to control its speed. The motor 86 drives the conveyor (not shown) in the duct 65 to carry the extracted materials to a vapor seal discharge device 87 as usual in extraction apparatus.

A typical installation for the above-described unit is an azeo-extraction column having a capacity of a hundred tons of raw poultry offal run on a 24 hour a day basis. The column has a 10 foot diameter and has six perforated plates, such as the plates 12 shown in FIG. 4, and one discharge plate 20. The total bed depth of solids from the top to bottom plates is approximately 9 feet. The solvent used in commercial heptane which has an azeotropic boiling temperature of 170°F. and a normal boiling temperature of 209°F. The unit has a capacity to evaporate approximately 6,000 pounds of water per hour.

Poultry offal is fed into the unit containing about 72 percent water and 10 percent oil, after it has been ground through a ¼ inch plate of a Weiler grinder (not shown), and pumped via an Ulrich pump into the extractor through feed control device 24 at an approximate temperature of 70°F. The material is dropped into the pool of miscella at the top of the unit and accumulates on the top plate 12 of the extractor.

Referring to FIG. 4 approximately 63,000 pounds of heptane vapor is passed from the evaporator 67 at a temperature of 240°F. through the duct 70 into the superheater unit 72. It leaves this unit at a temperature of approximately 320°F. and enters the bottom of the extractor casing 10 at a gage pressure of approximately 100 inches of water. This pressure is sufficient to pass the vapor upwards through the discharge plate 20 and the six perforated plates 12. The vapor as it passes through the extractor has a temperature gradient in the column as it flows successively from plate to plate. These temperatures from bottom to top are 188°F., 184°F., and 182°F., 176°F., 174°F., and 173°F. This temperature gradient reflects a decrease in moisture content as the material moves downwardly through the column against the upwardly rising heptane vapor. The flow of vapor to the column is controlled to maintain a temperature of approximately 171°F. (one degree above the azeotropic boiling temperature) at the sensing point 81 located in the vapor outlet duct 73. The sensing point 81 causes the proportioning valve 80 to vary the amount of liquid makeup solvent supplied to the evaporator 67 via the duct 79.

The vapor supplied to the casing 10 via the duct 69 passes through the perforations in the discharge plate 20 at an extremely high velocity which is sufficient to prevent a downward flow of either liquid solvent or solid, although the velocities are such that a slight settling action of the solid particles through the perforations of the plates 12 is permitted. The velocity of the vapor solvent is such that it is high enough to drag upwardly liquid solvent condensed and vaporizing moisture from the solids throughout the column along with dissolved oils upwardly until it collects in the miscella pool on top of the uppermost perforated plate 12.

The pool of miscella is maintained at a substantially constant level during operation of the unit. 800 pounds of oil which is dissolved in 17,000 pounds of liquid heptane is drawn off continuously through the screen 40 via the duct 69 to the pump 60 which delivers it through duct 62 to the liquid cyclone 63. The overflow from cyclone 63 now substantially free of fines leaves through the duct 66 to join makeup solvent supplied in duct 79 on its way to the evaporator 67. The underflow from the cyclone 63 contains most of the fines and returns them to the extractor column through the top of the housing 10.

The temperature of the pool of miscella is maintained at 173°F. and indicates the moisture content of the solids suspended in it to be close to the upper limit of free moisture, a condition conducive to keeping the screen 40 from binding.

The solids on the top plate 12 tend to form a settled bed at the bottom of the violently agitated miscella pool on the top plate. The particles settle through the perforations at a retarded rate, which might be described as a limited settling of particles from plate to plate. The agitators 19 will in varying degree assist in this settling action. As the particles move down through the column passing successively from plate to plate the moisture content of the particles decreases as evidenced by the temperature gradient mentioned above. On the discharge plate 20 the agitator 19 serves to sweep the particles through the discharge port 21 into the conveyor 65, which transports the particles to the rotary valve 87, the latter maintaining a back pressure of a hundred inches at the bottom of the column. Approximately 1,500 pounds of solvent free solid at a temperature of 200°F. and a moisture content of approximately 4 to 5 percent is obtained, and the oil content is reduced to between one to two percent. The particles leaving the extractor contain from thirty to forty percent liquid solvent by weight. The particles are maintained at this condition through a control system which has a sensing point 82 located just above the third plate from the bottom. A temperature of 184°F. at this point is maintained by controlling the rate of discharge of the conveyor 65 by a variable speed drive controlled by a control device 84.

Fine subdivision of the material to be ectracted prior to feeding to the extractor is not necessarily required. I have fed whole fish and unground chicken offal, including feet and heads directly to the extractor and I have found that a combination of the heat, solvent action and agitation by the stirrer arms soon reduced these materials sufficiently so that the material below the top plate was subdivided enough to produce the action desired and to enable the material in the layers to be fluidized by the upward movement of vapors therethrough. The solvent vapors pass upwardly through the successive layers and through the small apertures or perforations in the plates, which plates distribute the materials over the cross-section of the column of materials. The perforations are small enough to maintain the slot velocity at something near about 1,500 feet per minute, similar to sieve plate column design, and thereby prevent liquid from passing down through them. Part of the solvent vapor condenses to evaporate an approximately equal volume of water as a vapor which passes upwardly through the plates and material thereon and discharges with the excess solvent vapor through the outlet duct 73 from which they pass to a condenser (not shown). Liquid solvent is condensed in the column wherever liquid water exists in accordance with the azeotropic principle set forth in my U.S. Pat. No. 2,695,304, and as it condenses it dissolves oil from the material and is swept upwards to form a pool of miscella above the solids on the top plate. The revolving screen drum is only partially submerged in the miscella pool and it discharges miscella to a liquid cyclone separator 63 for final clarification. Sufficient water or steam is added to the underflow of the cyclone separator to wet it, and it is discharged into the top of the extractor.

When the extractor is operating on relatively dry materials and there is insufficient water in the feed material being extracted to condense enough solvent to completely extract the oil, additional solvent can be supplied through a rotary joint provided on the top of the hollow drive shaft 15 and then to stirrer arms that are hollow and perforated, such as one or more of the lower stirrer or agitator arms, in the same manner that sparging steam is introduced into a desolventizer toaster.

When vapor desolventizing of the materials under extraction is employed, the superheater 72 is used in the vapor line between the evaporator and the extractor. The temperature sensing device 76 which controls the flow of steam to the superheater is located about two or three plates above the bottom plate of the extractor. The control maintains the temperature at the sensory point a degree or two above the boiling temperature of the solvent. The evaporator provides sufficient pressure on the vapors to force the vapors upwardly through the extractor. Unless vapor desolventizing is being used, the superheater is not usually necessary and the vapors pass from the evaporator directly to the extractor. The 3-way valve 71 enables one to direct the vapors from the evaporator selectively, either through the superheater or directly to the extractor. When the solvent is water miscible, as explained for FIG. 1, a blower may be used to recycle the fluidizing solvent vapor.

The sensing device 82 is used as a measure of the moisture content of the material at that point in the extractor. There are moisture responsive devices available which would also give a suitable signal to the control device 87, but temperature sensing devices are more reliable and simpler and can be used because of the peculiar relationship between moisture in a material and a water immiscible solvent vapor. If the solvent is water soluble, it would be necessary to control the actual moisture content.

An approach to equilibrium is aided by the use of superposed plates as shown, since theoretical considerations of diffusional mass transfer require that material in one section or layer not move into another section or layer until equilibrium is established between the phases. This condition is approached by using apertured plates to divide the column of materials into a plurality of horizontal sections, or superposed layers in which the material is held for a time interval before it passes to the next section or layer below. The approach to equilibrium is further enhanced by the design which affords true counter current movement of solids and extraction solvent. With this improvement, the solids discharge from the extraction zone in contact with relatively oil-free solvent regardless of the oil-water ratio of the feed. The invention has produced equally good results with respect to oil extraction when the feed material was raw fish containing 72 percent water and 10 percent oil or fish scrap containing 10 percent oil and 8 percent water.

The bulk of the desolventizing of the solids can be carried out by establishing a zone of superheat at the bottom of the extractor casing where the solids are being discharged, thereby eliminating the cost of desolventizing equipment and the space it requires. The method is a superior means of using vapor desolventizing.

Superheated solvent vapor has been used to accomplish solvent removal but it has been done in equipment external to the extractor itself and under conditions not favorable to its use. To avoid losing much of the value of the superheat, the material being desolventized should be devoid of liquid water and as much liquid solvent as possible. Under the phase rule, liquid water, if present, will cause a condensation of solvent vapor regardless of its temperature. Since the function of the superheat is to evaporate liquid solvent from the material it is desirable to remove as much of it as possible from the solids before contacting them with superheated solvent vapor. The upward flow of vapor moves the liquid in a direction away from the desolventizing zone. These design features permit the solids to arrive in the desolventizing zone not only relatively free of liquid solvent but the moisture which would produce it by condensation.

The material on the top plate should be at a temperature which is not greater than the azeotropic boiling point by more than about 15 percent of the difference between the azeotropic and normal boiling points. For example, operating with commercial heptane as the extraction solvent (azeotropic boiling point 173°F.) we found a marked change from clear to "dirty" miscella when the temperature exceeded 177°F. As pointed out earlier, as long as no free water exists in the material the temperature is a measure of the moisture content of the solids and therefore the latter is in the range of the upper limits of bound moisture in the material. Practically the relationship is only approximate since the proximity to equilibrium conditions and true counterflow are factors but it is reliable enough for operating purposes.

The fines which are separated from the miscella in the cyclone separator are deposited first in the pool of miscella in casing 10 and should settle quickly to the bottom of the pool. By wetting the fines with steam added to the discharge end of the cyclone separator, the fines will settle more rapidly. Only sufficient moisture is added by the steam to induce the settling rate desired for reasons of economy.

In the unit there is a collection system used for all of the particles and material which is not shown in either FIG. 1 or FIG. 4. The vapors leaving the top of the extractor unit are passed through a cyclone separator where any possible entrained solid particles are separated from the vapor. The vapor leaving the cyclone separator is passed directly to a condenser while the entrained particles are delivered to a holding tank. This holding tank also receives the miscella liquid from the miscella take-off unit, as well as any solvents and liquids that fall to the bottom of the extractor unit during interruption of vapor flow or shut down of the extractor unit. It should be noted that the tank is under pressure of approximately 100 inches of water, and that the inlet line to the sealed tank from both the cyclone separator and the miscella takeoff unit is disposed below the level of liquid in the sealed tank. The material in the sealed tank is withdrawn therefrom by a pump and then passed to the liquid cyclone unit shown in FIG. 4 at the top of the extractor unit.

SUMMATION

This invention provides a means for subjecting oil-bearing particles to a very thorough mixing with solvent over a prolonged period of time, and effectively controlling the reaction between the particles and the solvent.

The creation of a plurality of fluidized beds makes it possible for the solvent to completely envelop and to diffuse into the oil-bearing material in a manner heretofore impossible.

The oil-bearing material moves progressively in a slow settling rate from top to bottom of the extractor successively downward from bed to bed against the upward drag of the solvent vapor introduced to the bottom of the column. The overall effect for all of the particles is one of a slow settling of particles from bed to bed against the upward flow of solvent vapor.

In each fluidized bed, normally the area defined between adjacent upper and lower plates, there is a random movement of solid particles due to the upward velocity of the solvent vapor. This condition is characteristic of a fluidized bed condition in the generally accepted sense, in that there is random movement of the particles and the pressure drop across the bed becomes less than a function of the square of the velocity of the fluid passing through the bed. It should be noted, however, that in this application although a fluidized bed exists, it is essential for operation of the extractor column to permit a controlled settling of particles downwardly through the perforate bed supporting plate. The agitating or superficial velocity of the solvent vapor produces the random effect discussed above. This velocity is usually from ½ to 3 feet per second and is the overall velocity of the entire body of solvent as it passes upwardly through the total cross-sectional area of the column.

The magnitude of this velocity is such that it carries upwardly with it all of the liquids in the column to the top of the extractor, where a miscella pool is formed above the uppermost bed of particulate material.

A second velocity, namely the slot velocity, or the velocity of the vapor through the perforate openings is also of importance. This velocity controls the settling rate, or the rate at which the particles pass through the perforate openings to settle downwardly from plate to plate. It has been found that this velocity should be in the range of from 2 and ½ to 60 feet per second to provide the desired frictional drag on the particles against their normal tendency to settle downwardly through the openings under the effect of gravity. It should be noted that the percentage of open area through the plate is normally within the range of from 5 to 20 percent of the overall total area of a given vapor plate. It has also been found that it is desirable, and possibly essential to flare outwardly the openings in the perforate plate on the underside thereof to preclude clogging of the openings.

It will be seen that the particle size, and its density is a factor in the settling action in the extractor. It has been found that preferably the particles sizes should be at a maximum no larger than one-third the perforate plate openings.

It should be noted when the particle size is relatively high with respect to the size of the openings, the agitator blades disposed above the perforate plates assist the settling rate by increasing the settling rate of particles through the perforate plate opening. For particles in the range of ⅛ inch to ¼ inch particle size we have found that slot velocities of about 15 feet per second are most satisfactory. Note however that for good mixing of the solvents with the solids, moving the reactants up the column, and the settling rate of the particles through the perforate plates gives a relatively wide range of velocity. Such factors as particle size, density of the particles, and opening size in the perforate plate all effect the most desirable operating velocity.

The different types of material, whether it be vegetable, fish, or animal material, the moisture content, and the particle size will all effect the preferable operating velocity for the upwardly travelling solvent vapor.

It might be noted that there has been satisfactory operation of this unit with fish scrap having a content of 8 percent oil and 10 percent moisture on a particle size of 15 to 20 mesh at solvent velocities approximately equal to those used for poultry offal containing 10 percent oil, 70 percent water, and having a particle size of approximately ¼ inch.

The superficial velocity in the column is fixed by the type of solvent used (for water immiscible solvents, the azeotropic ratio) and the water input to the column. The total free area of the plates is determined by the superficial velocity in the column and the number of perforations. The number of perforations is determined by the design velocity through the holes and is dependent upon the following factors:

1. The diameter of the holes should be 3 times that of the largest particle;
2. With increase in hole size there is a greater tendency for the liquid to weep at a given slot velocity;
3. Excessive velocity may prevent solids from moving down the column.

The use of agitators has been found to permit the use of higher solvent velocity which ordinarily would stop settling of particles through the perforate plate openings. The lowermost agitator unit performs a different function than that of the other agitator blades, since it sweeps solids along the lowermost plate to the conveyor unit.

It has been found that a clearer miscella is obtained when the feed material is ground, water is added and the materials mixed and compacted, usually by extrusion, prior to feeding to the top of the extractor unit.

It is believed that the prior moisture content of such particles when they are introduced into the boiling miscella brings about an agglomeration resulting in larger particles which settle more quickly to the bottom of the miscella pool.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

What is claimed is:

1. A continuous dehydration and oil extraction process, comprising the steps of:
   a. supplying finely-divided oil-bearing solid particulate material into the top of an extractor column having a plurality of successive, vertically spaced plates severally provided with a plurality of openings therethrough, said plates supporting said material in a series of vertically spaced beds,
   b. introducing extraction solvent vapor into the bottom of said extractor column to pass upwardly through said openings and beds to act upon said material and to pass out of the top of said extractor column, and
   c. controlling such introduction of said extraction solvent vapor so that the velocity of same rising through said extractor column is held in a range sufficient to separate individual solid particles of material in said beds to provide random particle movement throughout each of said beds, to carry liquids up through the successive beds of material to form a pool of miscella above the top bed of material, and to permit limited settling of said material downwardly from bed to bed through at least one of said openings through each of said plates, whereby the particles travel downwardly at a controlled rate while being subjected to the drying and extraction effect of said solvent vapor in its upward passage through said extractor column.

2. The continuous dehydration and oil extraction process as set forth in claim 1, including the further step of:
   a. adding liquid solvent to said extractor column at an intermediate point to act upon said material.

3. The continuous dehydration and oil extraction process as set forth in claim 1, wherein:
   a. the products disposed above the uppermost bed have a temperature not exceeding the azeotropic boiling point of the solvent and water by more than 15 percent of the difference between the azeotropic and the normal boiling points.

4. The continuous dehydration and oil extraction process as set forth in claim 1, including the further step of:
   a. agitating said material in each of said beds to encourage settling of said particles through at least one of said openings provided through each of said plates.

5. The continuous dehydration and oil extraction process as set forth in claim 1, including the further step of:
   a. superheating said solvent vapor prior to its introduction into said extractor column.

6. The continuous dehydration and oil extraction process as set forth in claim 1, including the further steps of:
   a. withdrawing miscella from said pool,
   b. subjecting such withdrawn miscella to centrifugal action to separate fines of said material, and
   c. introducing such separated fines into said extractor column through the top thereof.

7. The continuous dehydration and oil extraction process as set forth in claim 1, including the further step of:
   a. recycling uncondensed solvent vapors that have passed out of the top of said extractor column.

8. The continuous dehydration and oil extraction process as set forth in claim 1, including the further step of:
   a. removing such dehydrated and de-oiled material from the bottom of said extractor column at a rate responsive to the temperature at a lower one of said beds.

* * * * *

UNITED STATES PATENT OFFICE
CERTIFICATE OF CORRECTION

Patent No. 3,867,416      Dated February 18, 1975

Inventor(s) Roy W. Barns      Page 1 of 3

It is certified that error appears in the above-identified patent and that said Letters Patent are hereby corrected as shown below:

In the drawings, Figures 1 and 4 should appear as shown on the attached sheets.

Signed and Sealed this

*twenty-second* Day of *June 1976*

[SEAL]

Attest:

RUTH C. MASON
*Attesting Officer*

C. MARSHALL DANN
*Commissioner of Patents and Trademarks*